United States Patent [19]

Atwell

[11] Patent Number: 4,739,944

[45] Date of Patent: Apr. 26, 1988

[54] MANUAL-ELECTRIC SPINNING REEL

[76] Inventor: Eugene R. Atwell, 11680 Quay St., Broomfield, Colo. 80020

[21] Appl. No.: 788,237

[22] Filed: Oct. 17, 1985

[51] Int. Cl.[4] .................. A01K 89/012; A01K 89/017
[52] U.S. Cl. ................................ 242/84.1 A; 242/215
[58] Field of Search ...................... 242/84.1 A, 215; 254/339, 343, 345

[56] References Cited

U.S. PATENT DOCUMENTS

| | | | |
|---|---|---|---|
| 1,580,986 | 4/1926 | Aberson | 242/84.1 A |
| 3,017,134 | 1/1962 | Dwall | 242/84.1 A |
| 3,195,829 | 7/1965 | Balaguer | 242/84.1 A |
| 3,348,788 | 10/1965 | Vinokur | 242/84.1 A |
| 3,351,300 | 11/1967 | Nagy | 242/84.1 A |
| 3,460,778 | 8/1969 | Folbrecht | 242/84.1 A |
| 3,544,030 | 12/1969 | Daniels | 242/84.1 A |
| 3,697,011 | 10/1972 | Christensen et al. | 242/84.1 A |
| 3,932,954 | 1/1976 | Wyroski | 43/21 |

FOREIGN PATENT DOCUMENTS 1210983 11/1970 United Kingdom .......... 242/84.1 A

Primary Examiner—John Petrakes
Attorney, Agent, or Firm—Wm. Griffith Edwards

[57] ABSTRACT

A spinning reel for fishing which is arranged to retrieve the line either by a hand crank or by an electric motor. Either of the alternative drives may be actuated without effect on the other. The entire mechanism including the electric motor and batteries is enclosed in a single casing. Either of the controls for retrieving the line may be used without requiring operation of a preselecting mechanism. The motor drive control of the illustrated embodiment comprises an axially slidable worm wheel driven by the motor and biased to its driving position and which is moved against the bias and out of its driving position by operation of the hand crank.

7 Claims, 3 Drawing Sheets

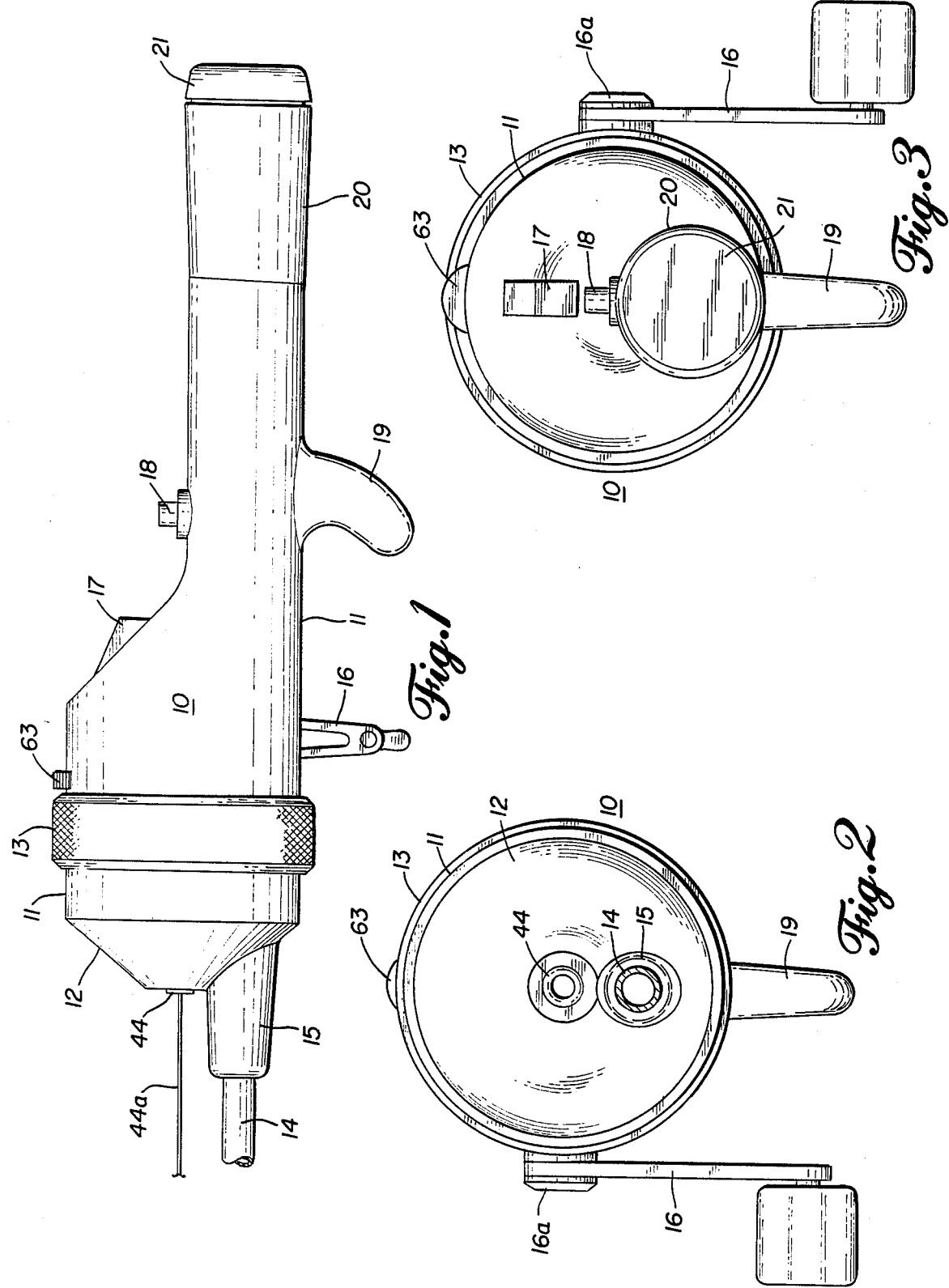

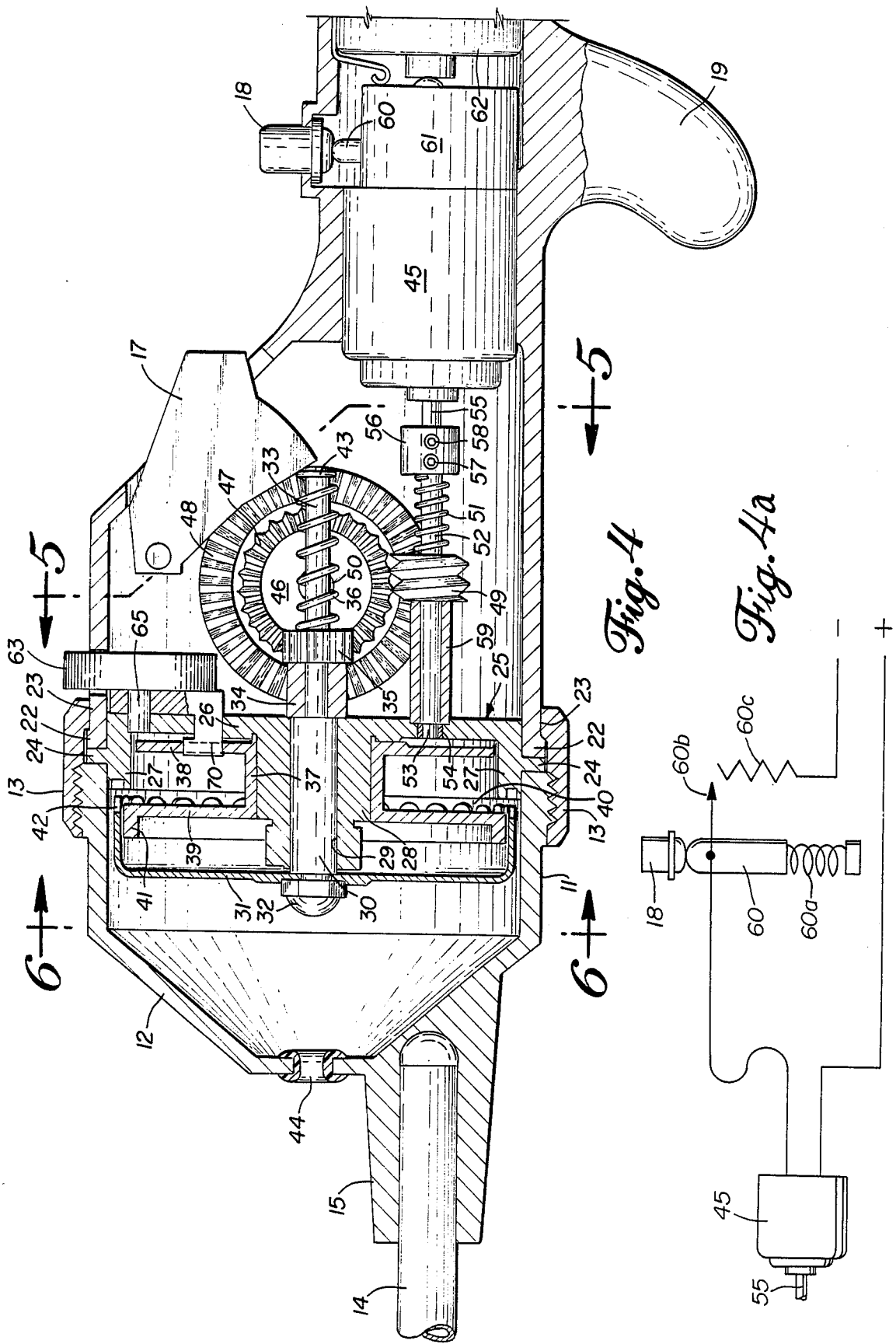

{ 4,739,944 }

MANUAL-ELECTRIC SPINNING REEL

This invention relates to fishing reels of the spinning type, and particularly to an improved reel of the manual-electric type in which the winding mechanism may be actuated either manually or by an electric motor.

BACKGROUND OF THE INVENTION

Fishing reels have been devised heretofore which are provided with arrangements whereby the winding of the line on the reel may be accomplished either manually by a crank or electrically by an electric motor mounted in the reel assembly. By way of example, U.S. Pat. No. 3,460,778 Folbrecht, discloses a fishing reel having a winding drum which may be operated by hand or by an electric motor mounted in the reel assembly. A two position operating lever is provided to select the mode of operation. British Pat. No. 1,210,983 discloses a fishing reel winding arrangement which may be operated manually or by an electric motor and which discloses the use of over-running mechanisms to prevent interference between the manual and the electric operating means.

It is an object of the present invention to provide a fishing reel of the manual-electric type including an improved arrangement for preventing interference between the manual and the electric motor driving mechanisms.

It is a further object of this invention to provide an improved manual-electric fishing reel which is rugged and requires fewer moving parts.

SUMMARY OF THE INVENTION

The present invention provides a manual-electric fishing reel assembly wherein the electric drive is effected through a worm or worm wheel which is mounted for axial movement on its shaft which is of hexagonal or other configuration to prevent rotation of the worm with respect to the shaft. The worm is biased toward gear teeth on a gear wheel which is actuated by the manual actuator or crank. When the crank is turned the teeth on the wheel move axially against its bias; thus the wheel may be rotated while it contacts the worm. This produces a clicking sound when the crank is turned. Should pressure on the crank be reversed, the worm wheel acts as a stop preventing the turning of the crank.

BRIEF DESCRIPTION OF THE DRAWINGS

FIG. 1 is a side elevation view of the handle end of a fishing rod provided with a reel assembly embodying the invention;

FIG. 2 is a left-end view of the fishing rod and reel assembly of FIG. 1;

FIG. 3 is a right-end view of the rod assembly;

FIG. 4 is an enlarged sectional elevation view of the reel assembly of FIG. 1;

FIG. 4a is a diagrammatic illustration of the electric control circuit for the reel assembly;

DETAILED DESCRIPTION OF THE DRAWINGS

Figure 5:
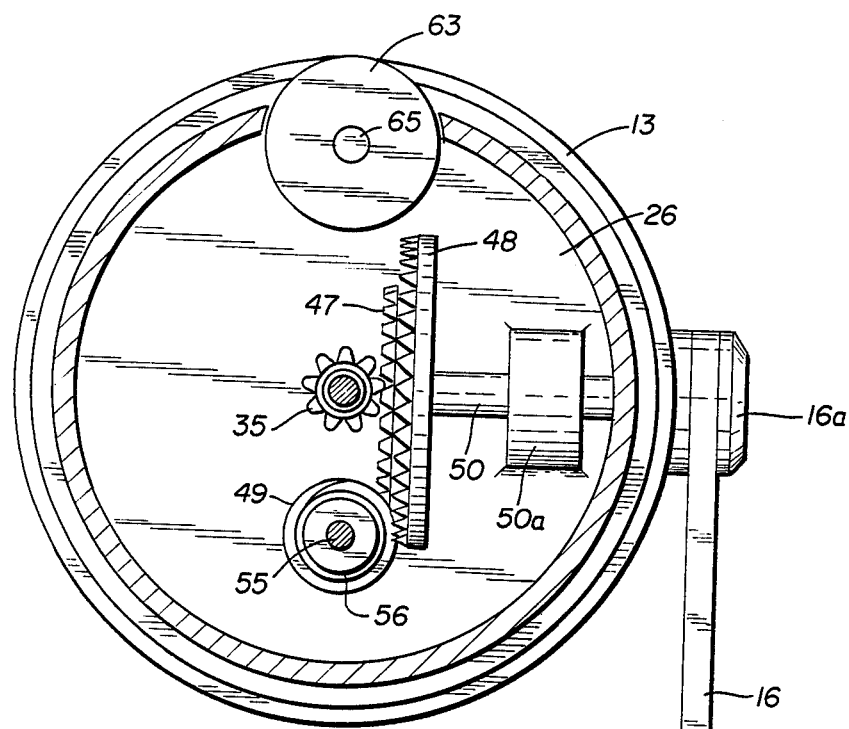
FIG. 5 is a sectional view taken along the line 5—5 of FIG. 4.

The rod and reel assembly illustrated in FIGS. 1, 2 and 3 includes a reel housing 10, a body portion 11 and a bell-shaped cap or closure 12 which are secured together by an internally threaded ring 13. The fishing rod, indicated at 14, is secured to the bell portion 12 in a boss or sleeve 15. A hand crank 16 is mounted on the body portion 11 and a control lever 17 is provided on the upper side of the body, the lever being readily accessible to the user for controlling the release of the line from the reel. An electric motor is provided in the housing to drive the reel and is controlled by a button 18 on the upper portion of the handle behind the lever 17. A hand or finger stop 19 is provided on the bottom of the body 10 below and slightly rearward of the control button 18. Electric batteries (not shown) are provided within the handle portion, indicated at 20, and a detachable cap 21 is provided for closing the battery chamber.

As shown in FIG. 4 the bell cap or closure 12 is secured to the body 11 by the ring 13, the ring being fitted over the body from the right hand end and being seated against a flange 22, the ring 13 having an inwardly extending flange 23 which engages the flange 22 and provides a stop for the ring when the threads of the ring are tightened to draw the body 11 and cover 12 together. On tightening of the ring 13 the two bodies are brought together against an outwardly extending flange 24 on a circular wall 25 which serves as a support for the mechanism of the assembly within the body 11.

The wall 25 is of a generally cupshaped configuration and comprises a circular body or supporting wall 26 having an outer rim 27 and a central hub 28 extending forwardly toward the cap 12. The rim 27 includes the attaching flange 24 and, with the wall 26, forms a cylindrical chamber. The hub 28 has a central bore 29 in which a shaft 30 is journaled for rotation and sliding movement. A cuplike spinning rotor 31 is secured to the lefthand end of the shaft 30 by a nut 32. The shaft has an extension 33 of reduced cross section which carries a spacer 34 adjacent the wall 26 and a gear 35 between the spacer and a spring 36; the spring exerts light biasing pressure urging the gear 35 against the spacer 34. The spring 36 is secured at its outer end to the shaft extension 33. The cuplike rotor 31 thus is biased toward the right in the position shown in FIG. 4.

A spool 37 for receiving and holding the fishing line is journaled on the hub 28 for free rotation in the cylindrical chamber and sliding movement with respect to the supporting wall 26. The inner wall 38 of the spool 37 is positioned close to the wall 26 and the outer wall of the spool indicated at 39 lies outside the cylindrical chamber in the wall 25 leaving an annular space 40 through which the line may pass to and from the reel. A flange 41 around the perimeter of the wall 39 is spaced from but close to the inside of the side wall of the rotor 31. The inner edge of the rotor flange 41 is provided with smooth rounded teeth, indicated at 42, which project into the space 40 and serve to engage the line and wind it about the spool 37 when the rotor 41 is turning and the line is being retrieved. This type of arrangement is well known in the field of spinning reels.

When a fish lure is to be cast, the lever 17 which is pivoted on the body portion 11 of the reel housing is pushed downward whereupon its lower end engages the right-hand end 43 of the shaft 33 and slides the shaft forward. At the end of the forward movement the edge of the flange 27 of the drum has widened the space 40 and has moved partially over the flange 41 of the spool 37. The line, indicated at 44a in FIG. 1, and which is drawn out by the cast lure will move smoothly from the spool over the drum and out of the cap 12 through a grommet 44 at the center of the cap and then along the rod. When the lure reaches its target area and falls into the water the lever 17 is released and the spinning rotor 31 returns to the position of FIG. 4 and is ready for retrieving the line.

The line may be retrieved either manually by turning the hand crank 16 or electrically by energization of an electric motor 45. The crank 16 and the motor 45 are arranged to drive the shaft 30 alternatively through a gear assembly 46. The gear assembly includes an inner gear 47 and an outer gear 48. The gear 47 meshes with the gear 35 which drives the rotor 31 and the outer gear 48 is positioned to be driven by a worm 49 which is driven by the electric motor 45. The gears 47 and 48 are fixed with respect to one another and are secured on the shaft of the crank 16, indicated at 50, as mounted in a bracket 50a extending from the wall 26 and rotates therewith. When the crank is turned, the gear 47 meshing with the spur gear 35 turns the shaft 30 and thereby rotates the spinner 31. The rotation of the gear 48 presses the worm 49 to the right against the force of a light spring 51 and the gear teeth on passing over the worm produce a clicking sound. The worm gear 49 is mounted on a shaft 52 which is of hexagonal cross section which prevents rotation of the worm with respect to the shaft while affording axial sliding movement of the worm on the shaft. The shaft 52 has a reduced end portion 53 which is cylindrical and is journaled in a bushing 54 mounted in the wall 25. The motor shaft indicated at 55 is coupled to the shaft 52 by a coupling 56; the coupling 56 is provided with set screws 57 and 58 for securing it to the shafts 52 and 55, respectively. The light spring 51 is mounted about the shaft 52 and exerts its pressure between the worm 49 and the coupling 56 which serves as a seat or stop for the spring. A spacer or sleeve 59 is provided about the shaft 52 between the wall 26 and the worm 49. The spacer 59 constitutes a stop which limits the movement of the worm 49 toward the left on the shaft 52, when it is desired to retrieve the line by operation of the electric motor 45, the button 18 is pressed which engages a rod 60 which is slidable within a control box 61 and is urged upwardly by a spring 60a shown in FIG. 4a. When the button 18 is pressed the first movement of the button connects a contact 60b and a resistance 60c in the circuit between the batteries, one of which is indicated at 62, and the motor 45 and starts the rotation of the motor; as the button 18 is pressed farther down it moves contact 60b along the resistance 60c and decreases the resistance between the battery and the motor and thereby increases the speed of the motor. Thus the speed of the motor may be controlled by operation of the button 18.

The direction of rotation of the motor 45 is such that the worm draws the bottom portion of the gear 48 toward the motor and causes rotation of the gears in the same direction as does the crank 16. It will be noted that, if the direction of rotation of the gear 48 is reversed, either by reverse operation of the crank or otherwise as by turning the spinning rotor 31, the gear 48 will turn clockwise and the worm 49 will prevent its operation after the worm has reached the stop 59. It is desirable to prevent reverse operation of the gears by turning of the crank and the crank may be provided with a free wheeling or overrunning connection in its hub indicated at 16a in FIGS. 2, 3, 5 and 6.

Figure 6:
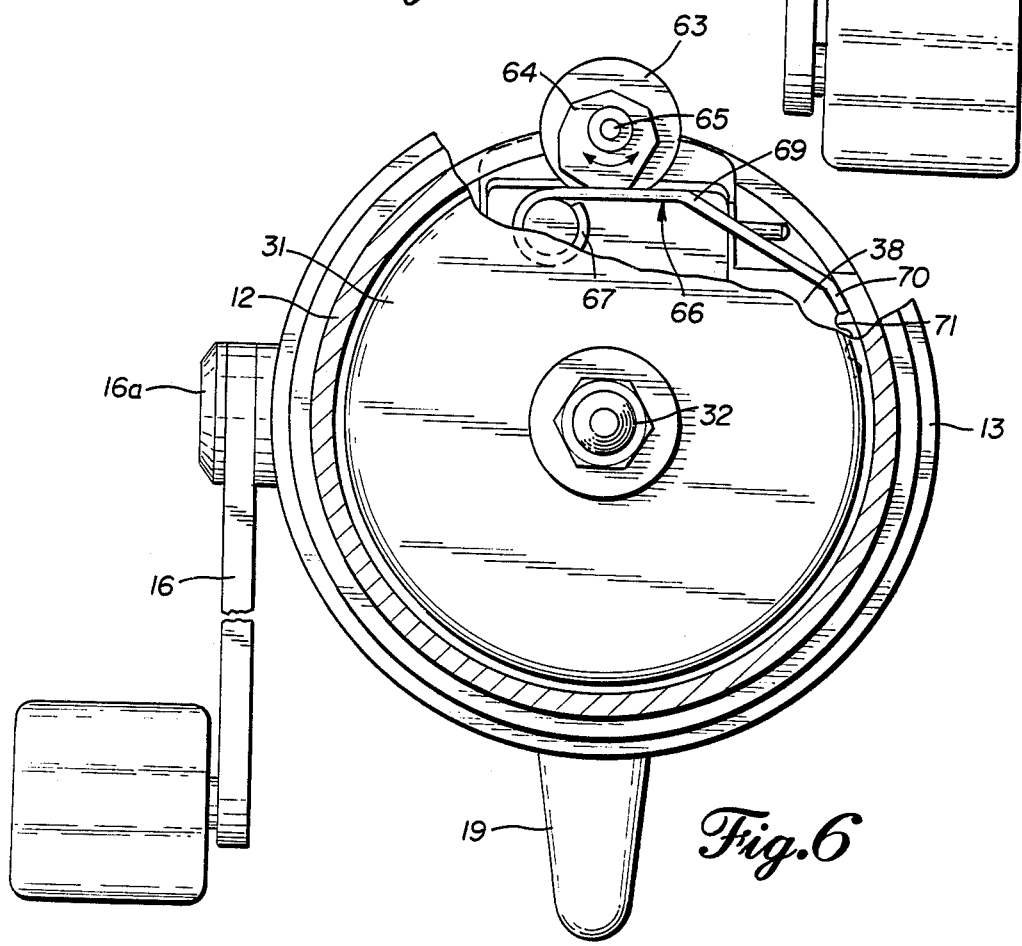
FIG. 6 is a sectional view taken along the line 6—6 of FIG. 4 with a portion broken away to show the drag control.

The light spring 51 on the worm gear shaft is sufficient to maintain the worm in its position against spacer 59 or against one of the teeth of the gear 48 so that as soon as the motor turns the worm moves into position against the spacer and drives the gear 48. When the crank is in operation to retrieve the lure the gear teeth of the gear 48 will be engaging the worm in succession and maintaining it in a position somewhere to the right of the spacer 59. During this operation the movement of the gear teeth past the worm produces a clicking sound during the retrieving operation. The drag is adjustable to determine the resistance to be offered while playing a fish. The degree of drag on the line is adjusted by movement of a thumb wheel 63. As shown in FIG. 6 the thumb wheel has a cam 64 rigidly secured to it and rotatable with it about a center pivot 65. As illustrated the cam 64 provides eight different cam faces which may be turned to engage a flexible bar 66 which is pivoted on the wall 26 at 67. The bar includes a lateral portion 68 which is flat and in a position to engage each of the flat surfaces of the cam 64. The bar is bent at 69 and has a flat extension 70 which passes through an opening in the wall to engage the upper edge of the wall 38 of the spool 37. The upper edge of the wall is provided with a series of rounded teeth 71 which have been illustrated as of substantially sinusoidal configuration. By varying the pressure on the bar 70 the resistance to movement of the line is controlled. It will be seen that the several faces of the cam 64 have been selected to provide different distances between the bar 64 and the center pivot 65 of the cam. When a fish is on the line and is pulling the line out from the spool, engagement of the bar element 70 with the teeth 71 produces an intermittent sound which serves to indicate that the line is being pulled. The thumb wheel 63 may be rotated at any time to change the pressure on the bar and hence the resistance exerted against the fish.

This invention provides a spinning reel assembly wherein either the manual or the electric motor reeling function may be performed without requiring the moving of a selecting controller from one position to another. Either the hand crank or the electric motor may be used depending on the desire of the operator, the use of either is accomplished merely by turning the crank or by pressing the control button for the motor. It is not necessary to preset a control for either mode of operation and the arrangement of the worm and its spring bias assures ready operation of the electric motor and makes possible the quick change from motorized to manual retrieving of the line by merely changing to the other control.

While the invention has been described in connection with a specific spinning reel assembly, various other applications and modifications will occur to those skilled in the art. Therefore, it is not desired that this invention be limited to the details illustrated and described and it is intended, by the appended claims, to cover all modifications which fall within the spirit and scope of the invention.

I claim:

1. A fishing reel assembly including a spool mounted about an axis in said assembly for receiving a fishing line, a winding member mounted for rotation about said axis and for sliding movement axially with respect to said spool and arranged to engage the fishing line for winding the fishing line about said spool, means for biasing said winding member toward its spool winding position, first manual means for moving said winding member axially away from its biased position for releasing the line for casting, a second manual means including a toothed gear wheel for turning said winding member for winding the line on said spool, an electric motor mounted in said assembly and having a shaft with a worm mounted thereon for engaging teeth on said gear wheel, said worm being slidable axially along said shaft, light spring means for biasing said worm axially toward driving engagement with teeth on said gear wheel and for maintaining contact with at least one of said teeth whereby rotation of said gear wheel is effected upon starting of said motor, the direction of rotation of said motor being selected to drive said gear wheel in the direction for winding the line on said spool, said means for biasing of said worm affording axial displacement of said worm and movement of successive teeth of said gear wheel into engagement with said worm during the winding of the line on said spool by said second manual means.

2. A fishing reel assembly as set forth in claim 1 wherein said gear wheel and said worm are so constructed and arranged that the axial displacement of said worm by successive teeth on said gear wheel during manual operation of said toothed gear wheel produces a clicking sound.

3. A fishing reel assembly as set forth in claim 1 including an electric battery mounted in said assembly for energizing said motor, and means including a manual switch on said assembly for controlling the speed of said motor when rewinding said line.

4. A fishing reel assembly as set forth in claim 3 including a variable resistance associated with said switch for controlling the speed of said motor.

5. A fishing reel assembly as set forth in claim 1 including means for preventing rotation of said worm with respect to said shaft while affording axial sliding of said worm along said shaft.

6. A fishing reel assembly including a spool mounted about an axis in said assembly for receiving a fishing line, a winding member mounted for rotation about said axis and for sliding movement axially with respect to said spool and arranged to engage the fishing line for winding the fishing line about said spool, means for biasing said winding member toward its spool winding position, first manual means for moving said winding member axially away from its biased position for releasing the line for casting, a second manual means including a toothed gear wheel for turning said winding member for winding the line on said spool, an electric motor mounted in said assembly and having a shaft with a worm mounted thereon for engaging teeth on said gear wheel, said worm being slidable axially along said shaft, means for biasing said worm axially toward driving engagement with teeth on said gear wheel and for maintaining contact therewith, the direction of rotation of said motor being selected to drive said gear wheel in the direction for winding the line on said spool, said means for biasing said worm affording axial displacement of said worm and movement of said gear wheel during the winding of the line on said spool by said second manual means and further including a sleeve on said shaft constituting a stop for determining the driving position of said worm and means for providing a second stop on said shaft spaced from said gear wheel, and wherein said axial biasing means of said worm is a weak coiled spring positioned between said worm and said second stop and affording easy displacement of said worm along said shaft toward said second stop.

7. A fishing reel assembly including a spool mounted about an axis in said assembly for receiving a fishing line, a winding member mounted for rotation about said axis and for sliding movement axially with respect to said spool and arranged to engage the fishing line for winding the fishing line about said spool, means for biasing said winding member toward its spool winding position, first manual means for moving said winding member axially away from its biased position for releasing the line for casting, a second manual means including a toothed gear wheel for turning said winding member for winding the line on said spool, an electric motor mounted in said assembly and having a shaft with a worm mounted thereon for engaging teeth on said gear wheel, said worm being slidable axially along said shaft, means for lightly biasing said worm axially toward driving engagement with teeth on said gear wheel and for maintaining contact therewith, the direction of rotation of said motor being selected to drive said gear wheel in the direction for winding the line on said spool, said means for biasing of said worm affording axial displacement of said worm and movement of said gear wheel during the winding of the line on said spool by said second manual means and further including stop means for preventing movement of said worm beyond its driving position whereby said worm in its driving position prevents reverse rotation of said toothed gear wheel of said second manual means.

* * * * *